Dec. 11, 1962
J. PICKLES
3,067,627
FRICTION COUPLED TRANSMISSION
Filed June 20, 1960
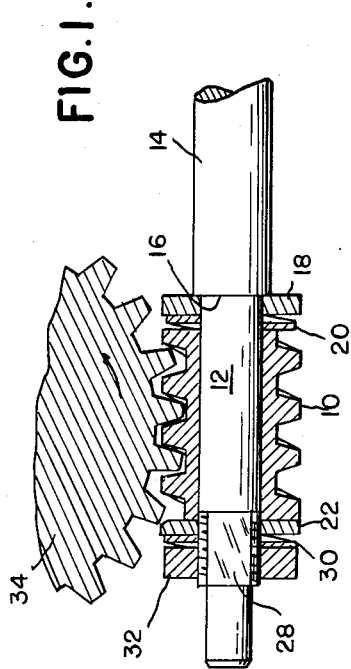
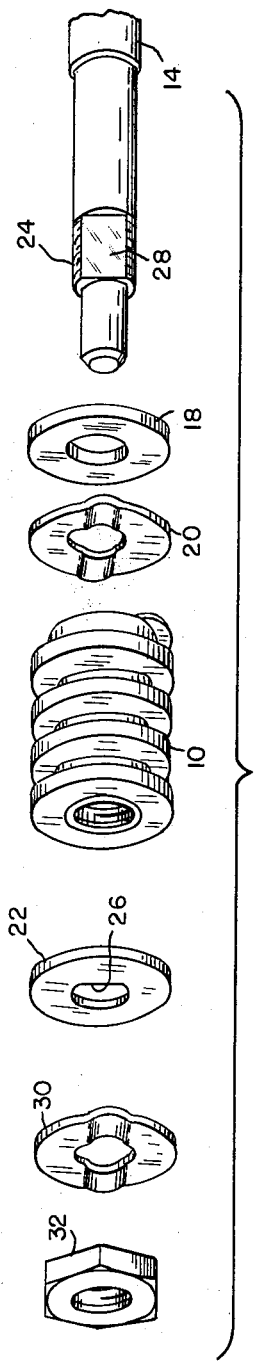
INVENTOR.
JOSEPH PICKLES
BY Whitemore,
Hulbert & Belknap
ATTORNEYS

United States Patent Office 3,067,627
Patented Dec. 11, 1962

3,067,627
FRICTION COUPLED TRANSMISSION
Joseph Pickles, Dearborn, Mich., assignor to Ferro Stamping Company, Detroit, Mich., a corporation of Michigan
Filed June 20, 1960, Ser. No. 37,398
6 Claims. (Cl. 74—425)

The present invention relates to a friction coupled transmission.

In many cases, a gear transmission such for example as one designed to connect a motor to a driven device, includes a friction clutch or slipping construction arranged to permit slipping if the operated device is overloaded. A typical example of a power transmission employing such means is in the transmission coupling a drive motor to a window regulator mechanism in an automotive vehicle.

In the past, a slip connection has been included in such a transmission including friction discs or plates urged into predetermined pressure contact by suitable means such for example as an adjustable spring. However, difficulty has been encountered due to the failure of the builders of this mechanism to tighten the spring biasing means to the proper degree. Thus, in some cases the clip connection slips before a minimum required torque has been reached. In other cases, the device will not slip until the actuated mechanism is or may be seriously overloaded.

It is an object of the present invention to provide a slip connection which is less sensitive to variations in spring pressure when the device is assembled.

It is a further object of the present invention to provide a slip connection in a transmission including a pair of friction surfaces which are urged into pressure frictional engagement as a consequence of loading of the transmission.

More specifically, it is an object of the present invention to provide in a transmission a driving worm-driven worm gear combination in which the worm is mounted on a drive shaft for rotation and endwise movement, in combination with friction means energized by axial movement of the worm under load.

It is a further object of the present invention to provide a slipping worm including a drive shaft on which the worm is rotatable and axially movable, friction driving surfaces interposed between the worm and shaft operable to transmit a driving torque to the worm which is a function of the load applied to the worm.

Other objects and features of the invention will become apparent as the description proceeds, especially when taken in conjunction with the accompanying drawing, illustrating a preferred embodiment of the invention, wherein:

FIGURE 1 is a fragmentary elevational view of a worm gear-slipping worm combination with parts in section.

FIGURE 2 is an exploded view of the components making up the slipping worm.

Referring now to the figures there is shown a worm 10 mounted on a reduced intermediate portion 12 of a drive shaft 14 for both rotational movement and for movement axially with respect to the shaft. The shaft is provided with a shoulder 16 against which is seated an annular washer 18 forming a seat for a spring washer 20, which in turn engages one end of the worm 10.

At its opposite end the worm is engaged by a friction "D" hole washer 22, the washer being retained against rotation on a threaded portion or following section 24 of the shaft by virtue of engagement between the flat side 26 of the D-hole and a flat surface 28 on the shaft. Located outwardly of the friction washer 22 is a second spring washer 30 retained under compression by means of the nut 32.

In use, the worm 10 is in mesh with a worm gear, a portion of which is indicated at 34. For purposes of explanation, let it be assumed that the slip construction is provided to predetermine the load which may be applied to the worm gear to rotate it in the direction of the arrow. Before drive means are energized tending to rotate the drive shaft 14, the friction effective to turn the worm 10 is determined by the extent to which the nut 32 is tightened. As a result of tightening the nut 32, the spring washers 20 and 30 are partially compressed and the friction washer 22 is urged against the left hand end of the worm 10, as seen in FIGURE 1. The friction acting between the friction washer 22 and the worm 10 may be of a relatively small value, but it is sufficient to initiate rotation of the worm 10 when the shaft 14 is rotated. The initial rotation of the worm 10 tending to rotate the worm gear 34 in the direction of the arrow develops an equal and opposite reaction on the worm tending to move it to the left as seen in FIGURE 1. Movement of the worm 10 to the left necessarily results in corresponding movement of the friction washer 22 and results in a further compression of the spring washer 30. Thus, the forces between the engaged surfaces of the friction washer 22 and the worm 10 are increased in accordance with the load. In the usual case the pressure developed by the endwise force applied to the worm 10 may be considerably greater than the initial forces resulting from tightening the nut 32.

As a result of the foregoing, the slip worm is substantially insensitive to variations in the initial forces developed by tightening the nut 32. The actual forces which determine the torque at which the worm will slip on the shaft 14 are developed primarily by the reaction between the worm and worm gear.

In the foregoing, friction developed between the right hand end of the worm, the spring washer 20, the washer 18, and the shoulder 16 have been disregarded since these may be relatively small. On the other hand, it is within the contemplation of the present invention to provide friction washers in engagement with both ends of a worm urged into engagement with the ends of the worm by yieldable spring means. By selecting friction washers having different co-efficients of friction, different torques may be developed upon rotation of the drive shaft in opposite directions.

The drawing and the foregoing specification constitute a description of the improved friction coupled transmission in such full, clear, concise and exact terms as to enable any person skilled in the art to practice the invention, the scope of which is indicated by the appended claims.

What I claim as my invention is:

1. A transmission having a friction device therein comprising a drive shaft, a driving worm rotatably carried by said shaft for limited endwise movement thereon, a friction element carried by said shaft for rotation therewith and limited endwise movement with respect thereto, said friction element engaging one end of said worm a worm gear in mesh with said worm, resilient means maintaining said friction element in light friction contact with said worm to provide an initial predetermined relatively small amount of friction, which is substantially less than required to rotate said worm gear, between said friction element and said worm to initiate immediate rotation of said worm upon rotation of said shaft, said worm being effective to apply a force tending to rotate said worm gear, which develops an equal and opposite reactive force on the worm substantially axially thereof effective to urge said worm and friction element in a direction to further compress said resilient means and substantially increase the friction between said friction element and said worm in accordance with compression of said resilient means as occasioned by the load on said worm gear, slippage occurring between said worm and said shaft when said reactive force exceeds the maximum frictional resistance to slippage between said friction element and said worm.

2. A slipping worm drive adapted to drive a worm gear until a predetermined load is obtained comprising an integral drive shaft having a plurality of sections including a drive section which is adapted to be connected to a source of energy, an annular worm engaging section and a following section of non-circular cross-section, means forming a first fixed abutment between said drive section and said worm engaging section, a washer on said worm engaging section directly oposite from said first fixed abutment, a worm mounted on said worm engaging section for rotation and limited axial movement, said worm having one end opposite from said washer and having teeth in mesh with the teeth on said worm gear, an axially movable friction element on said following section having an opening conforming to the cross-section of said following section, said friction element having a reactive friction surface directly adjacent to the other end of said worm, an adjustable abutment on said following section spaced from said friction element, resilient means interposed on said following section between said friction element and said adjustable abutment for maintaining said friction element in light friction contact with said worm to provide an initial predetermined relatively small amount of friction, which is substantially less than required to rotate said worm gear, between said friction element and said worm to initiate immediate rotation of said worm upon rotation of said shaft, said worm being effective to apply a force tending to rotate said worm gear, which develops an equal and opposite reactive force on the worm substantially axially thereof effective to urge said worm and friction element in a direction to further compress said resilient means and substantially increase the friction between said friction element and said worm in accordance with compression of said resilient means as occasioned by the load on said worm gear, slippage occurring between said worm and said shaft when said reactive force exceeds the maximum frictional resistance to slippage between said friction element and said worm.

3. A slipping worm drive defined in claim 2 wherein said following section has a D-shaped cross-section.

4. A slipping worm drive defined in claim 2 wherein second resilient means is provided on said worm engaging section between said washer and said one end of said worm.

5. A slipping worm drive defined in claim 2 wherein said following section is threaded and said adjustable abutment is in the form of a nut which is threaded on said following section.

6. A slipping worm drive defined in claim 2 wherein said resilient means is in the form of a spring washer.

References Cited in the file of this patent
UNITED STATES PATENTS

| | | |
|---|---|---|
| 1,260,145 | Cochran | Mar. 19, 1918 |
| 1,472,848 | Maag | Nov. 6, 1923 |
| 2,288,849 | Schwitzer | July 7, 1942 |
| 2,341,968 | West | Feb. 15, 1944 |
| 2,536,920 | Ducanis | Jan. 2, 1951 |
| 2,782,813 | Dudek | Feb. 26, 1957 |
| 2,857,750 | Fox | Oct. 28, 1958 |
| 2,939,330 | Margetts | June 7, 1960 |